(12) United States Patent
Rauch

(10) Patent No.: US 11,549,683 B2
(45) Date of Patent: Jan. 10, 2023

(54) TAPERED PLUG BURNER CLEANING PORTS

(71) Applicant: Novelis Inc., Atlanta, GA (US)

(72) Inventor: Edwin L. Rauch, Fulton, NY (US)

(73) Assignee: Novelis Inc., Atlanta, GA (US)

( * ) Notice: Subject to any disclaimer, the term of this patent is extended or adjusted under 35 U.S.C. 154(b) by 300 days.

(21) Appl. No.: 16/654,359

(22) Filed: Oct. 16, 2019

(65) Prior Publication Data

US 2020/0132299 A1 Apr. 30, 2020

Related U.S. Application Data

(60) Provisional application No. 62/751,212, filed on Oct. 26, 2018.

(51) Int. Cl.
*F23D 14/50* (2006.01)
*B08B 9/043* (2006.01)
(Continued)

(52) U.S. Cl.
CPC ............ *F23D 14/50* (2013.01); *B08B 9/0436* (2013.01); *F23D 14/46* (2013.01); *F27D 25/001* (2013.01);
(Continued)

(58) Field of Classification Search
CPC ...... F23D 14/50; F23D 14/46; F23D 2209/30; F23D 2900/00002; F27D 99/0033; F27D 25/001; B08B 9/0436
See application file for complete search history.

(56) References Cited

U.S. PATENT DOCUMENTS 1,710,464 A * 4/1929 Wilputte ................. C10B 57/12
201/38
2,869,752 A * 1/1959 Hall ......................... F16J 13/24
220/298
(Continued)

FOREIGN PATENT DOCUMENTS

BE 864130 A 6/1978
DE 3149550 6/1983
(Continued)

OTHER PUBLICATIONS

Frank Hegewald, Heating oil burner for industrial furnace, with burner containing radial gas slide with measured cleaning gas leakage (Translation) (Year: 2001).*
(Continued)

*Primary Examiner* — Alfred Basichas
(74) *Attorney, Agent, or Firm* — Kilpatrick Townsend & Stockton LLP

(57) ABSTRACT

A burner for a metal-melting furnace can releasably receive a tapered plug in sealing engagement with an access passage aligned with an air passage. The burner may be configured to extend through a wall of the metal-melting furnace so that the air passage is through a front face within the furnace and so that the access passage is through a rear face outside of the furnace. The access passage may be aligned with the air passage to permit a rigid structure to be passed through the burner from outside the furnace to dislodge build-up of solidified metal from the air passage. The tapered plug may be moveable between a sealing configuration of being received in a seat to seal the access passage during burner operation and a cleaning configuration of being removed from the seat to expose the access passage for insertion of the rigid structure.

20 Claims, 7 Drawing Sheets

(51) Int. Cl.
  *F27D 25/00*    (2010.01)
  *F23D 14/46*    (2006.01)
(52) U.S. Cl.
  CPC ............... *F23D 2209/30* (2013.01); *F23D 2900/00002* (2013.01)

(56) References Cited

U.S. PATENT DOCUMENTS 3,361,419 A   1/1968   Siemssen
4,586,895 A   5/1986   Battles

FOREIGN PATENT DOCUMENTS

| DE | 19941091 | A1 * | 3/2001 | ............ F23D 11/102 |
| EP | 1488172 | | 10/2010 | |
| KR | 20060021122 | | 3/2006 | |
| KR | 100829234 | | 5/2008 | |
| WO | 0229317 | | 4/2002 | |
| WO | 2008021083 | | 2/2008 | |
| WO | 2008117147 | | 10/2008 | |

OTHER PUBLICATIONS

International Application No. PCT/US2019/056470, International Preliminary Report on Patentability, dated May 6, 2021, 9 pages.
International Application No. PCT/US2019/056470, International Search Report and Written Opinion, dated Dec. 3, 2019, 13 pages.
Application No. KR10-2021-7005304, Office Action, dated Jan. 17, 2022, 10 pages.
Canadian Application No. 3,109,095, "Office Action", dated May 27, 2022, 4 pages.
Chinese Application No. 201980070394.9, "Office Action", dated May 24, 2022, 34 pages.
KR10-2021-7005304, "Notice of Decision to Grant", dated Jul. 28, 2022, 3 pages.
IN202117015980, "First Examination Report", dated Sep. 7, 2022, 6 pages.

* cited by examiner

TAPERED PLUG BURNER CLEANING PORTS

CROSS-REFERENCE TO RELATED APPLICATIONS

This application claims the benefit of U.S. Provisional Application No. 62/751,212, filed Oct. 26, 2018, which is incorporated herein by reference in its entirety.

FIELD

The present disclosure generally relates to metal-melting furnaces heated by burners and more specifically to associated processes and systems for cleaning and maintaining such burners.

BACKGROUND

Top charge furnaces can be utilized in a variety of metal-processing contexts. Typically scrap metal and/or other source material items are dropped through the top charge furnace's open top and into a zone where burners can provide heat to melt the inputted material. The resulting molten metal can be subsequently routed out of the charge furnace for use in other metal processing equipment.

In many scenarios, material dropped in to the top charge furnace may drop with sufficient force to cause liquid metal within the top charge furnace to splash in unknown or uncontrolled directions within the furnace. Such splashed liquid metal may land on different surfaces and ultimately solidify into obstructions or other buildup that negatively impact the burners or otherwise become problematic over time. Additionally, during melting of scrap, localized high gas velocity can sweep droplets of molten metal into the gas stream. In the case of regenerative burners, much of the exhaust gas stream is drawn through the burner(s) that are in the exhaust mode of the burner cycle. These droplets can impact, oxidize, and adhere to the faces of the burner, resulting in obstructions. Efforts to remove such buildup or obstructions may be expensive and/or time-consuming, such as in situations where production through a top charge furnace is halted to permit the top charge furnace to cool sufficiently to allow personnel to enter the top charge furnace and break away the buildup.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

Certain examples herein address devices and methods for cleaning burners of metal-melting furnaces. Generally, a burner may include an air passage exposed to an inside of a furnace, e.g., at a position that may receive or come in contact with splashed metal that may solidify into blockages. An opposite end of the burner (e.g., outside the furnace) may include an access passage suitably aligned with the air passage to permit a rod or other structure to be inserted from the outside of the furnace to dislodge the blockage in the air passage. The access passage may interface with a tapered plug that can be alternatively seated in the passage to seal the burner for operation, or removed to allow a rod or other structure to be inserted through the access passage for cleaning purposes. The tapered shape of the plug may facilitate uniform sealing and repeatable removal of the plug from the air passage to allow removal of any obstructions/blockages in the air passage.

In various examples, a method is provided. The method can include removing a tapered plug from a seat in an exterior portion of a burner to expose an access passage from a position outside a wall of a metal-melting furnace. The method can also include pushing a rod from outside the burner and outside the metal-melting furnace, in through the access passage exposed by removing the tapered plug, and toward or through an air passage extending between an interior of a body of the burner and an inside of the metal-melting furnace. The method can also include dislodging, from the air passage and in response to movement of the rod toward or through the air passage, build-up of metal splashed from the metal-melting furnace and solidified in the air passage.

In various examples, a system is provided. The system can include a top charge furnace comprising a wall bounding an inside of the top charge furnace. The system can further include a burner extending through the wall and comprising a body. The body may define a front face within the inside of the top charge furnace; a rear face outside of the inside of the top charge furnace; an air passage through the front face; a fuel passage through the front face; and an access passage through the rear face and aligned with the air passage to permit a structure to be passed through the burner from outside the top charge furnace to clean out build-up of solidified metal from the air passage. The system can further include a tapered plug releasably received in the rear face and in sealing engagement with the access passage to seal off the access passage during operation of the burner.

In various examples, a burner assembly is provided. The burner assembly may include a body defining a chamber having a front face and a rear face. An air passage may be defined through the front face. A fuel passage may be defined through the front face. An access passage may be defined through the rear face and aligned with the air passage. A tapered seat may form an entrance to the access passage. A tapered plug may be provided and may be moveable between a sealing configuration and a cleaning configuration. The tapered plug in the sealing configuration may be received in the tapered seat to seal the access passage during operation of the burner assembly. The tapered plug in the cleaning configuration may be removed from the tapered seat to expose the access passage and permit insertion of a rod or other rigid structure through the access passage to dislodge any blockage from the air passage.

Other objects and advantages will be apparent from the following detailed description of non-limiting examples.

BRIEF DESCRIPTION OF THE FIGURES

The specification makes reference to the following appended figures, in which use of like reference numerals in different figures is intended to illustrate like or analogous components.

DETAILED DESCRIPTION

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below. The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. As used herein, the meaning of "a," "an," and "the" includes singular and plural references unless the context clearly dictates otherwise.

Figure 1:
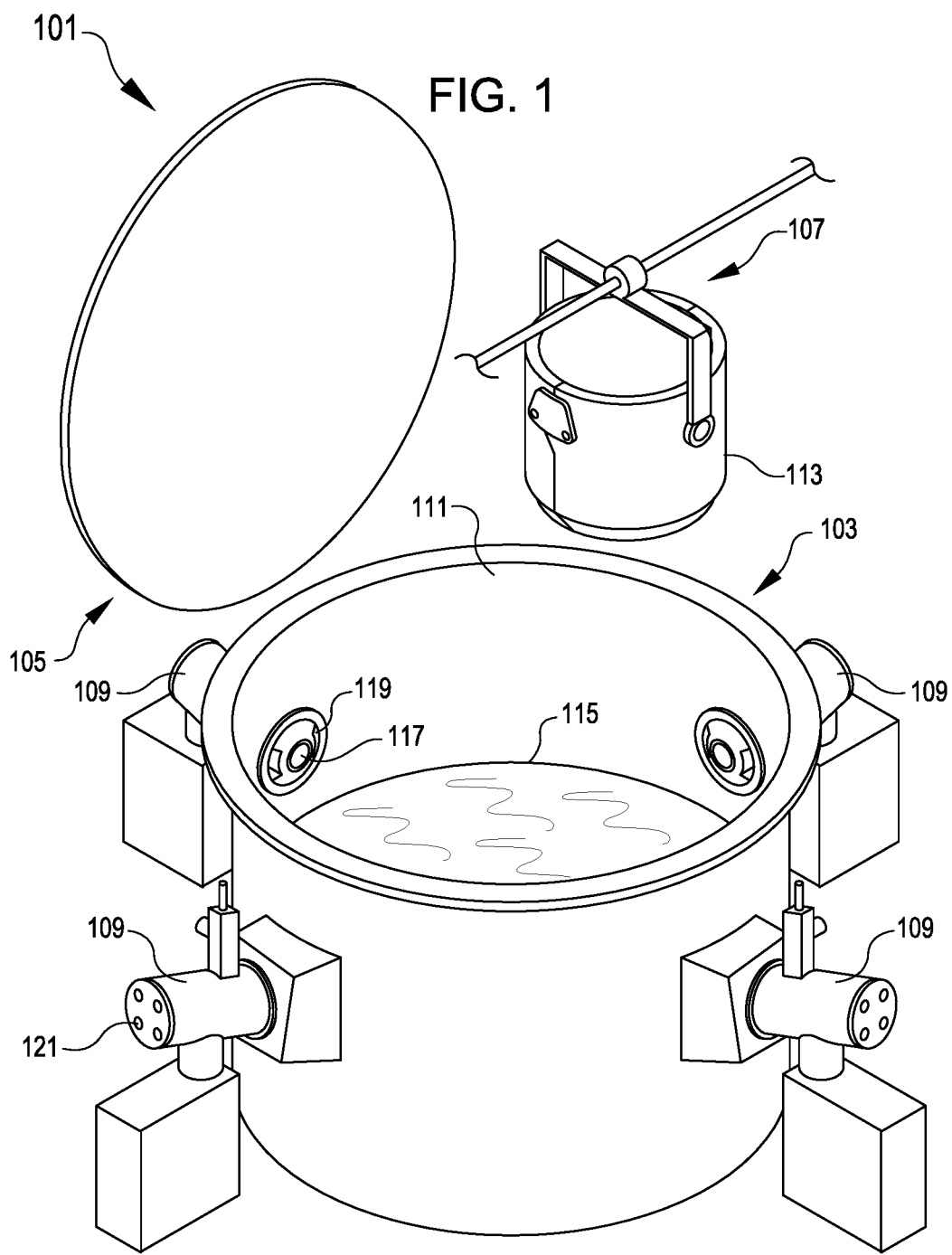
FIG. 1 is a top perspective view of a top charge furnace heated by burners according to various embodiments.

FIG. 1 depicts a system 101 for melting metal. The system 101 as depicted in FIG. 1 includes a metal-melting furnace 103, a cover 105, a loader 107, and a plurality of burners 109.

The furnace 103 can include one or more walls 111 that define and/or bound an interior volume of the furnace 103. The furnace 103 in FIG. 1 is depicted as having a circular shape defined by a single wall 111, although the furnace 103 may feature any other number of walls 111 (such as two, three, four, or more than four) and/or any other cross-sectional shape including but not limited to triangular, quadrilateral, or other polygonal shapes. The wall 111 may be capable of withstanding high temperatures that may be implemented to melt different types of metal including, but not limited to, aluminum, steel, titanium, or other pure or alloyed metals. For example, the wall 111 may include suitable refractory material.

The term "refractory material" as used herein may include any materials that are relatively resistant to attack by molten metals and that are capable of retaining their strength at the high temperatures contemplated for the material in use. Such materials may include, but are not limited to, ceramic materials (inorganic non-metallic solids and heat-resistant glasses) and non-metals. A non-limiting list of suitable materials includes the following: the oxides of aluminum (alumina), silicon (silica, particularly fused silica), magnesium (magnesia), calcium (lime), zirconium (zirconia), boron (boron oxide); metal carbides, borides, nitrides, silicides, such as silicon carbide, particularly nitride-bonded silicon carbide (SiC/Si3N4), boron carbide, boron nitride; aluminosilicates, e.g. calcium aluminum silicate; composite materials (e.g. composites of oxides and non-oxides); glasses, including machinable glasses; mineral wools of fibers or mixtures thereof; carbon or graphite; and the like. As an illustrative example, in some contexts, refractory materials may withstand temperatures up to 1200° C. (e.g., which may be suitable for processing of aluminum or copper, though not likely steel, which tends to be processed at higher temperatures for which other suitable refractory material may nevertheless be available), although in some other contexts, refractory material suitable for processing aluminum and its alloys may be selected to withstand working temperatures in the lesser range of 400 to 800° C.

The furnace 103 can be a top charge furnace. For example, the furnace 103 may have an upper opening defined by the wall 111. The cover 105 may correspond in size to all or a part of the opening of the furnace 103. In operation, the cover 105 may be arranged to block the opening of the furnace 103 and retain heat or reduce heat loss from the furnace 103, for example, when the furnace 103 is being operated. The cover 105 may also be retractable or otherwise removable from the top opening of the furnace 103 to allow access into the furnace 103. For example, the cover 105 may be retracted to allow the loader 107 to charge the furnace 103 with scrap or other material to be melted into molten metal for subsequent processing. Although the loader 107 is depicted as a bucket 113 that may be opened at a bottom or tipped to drop contents of the bucket into the furnace 103, the loader 107 may additionally or alternatively include hooks, pinchers, trays, or other suitable structure capable of dropping or otherwise loading material into the furnace 103. In some aspects, the loader 107 may include or be coupled with an overhead crane or other suitable device for moving the bucket 113 or other conveying structure of the loader 107.

In operation, the furnace 103 may provide heat (e.g., via the burners 109) to melt scrap or other material introduced by the loader 107. In some embodiments, the furnace 103 includes a fill line 115 corresponding to a capacity limit for molten metal within the furnace 103. The fill line 115 may define a boundary line for a molten metal containment area within the furnace 103.

The furnace 103 may be supplied with heat by any suitable number of burners 109 (e.g., including one, two, three, four, or more than four), although first, second, third, and fourth burners 109 are depicted by way of example in FIG. 1. However, for clarity purposes, the discussion below will primarily focus on an individual burner 109 relative to the furnace 103.

The burner 109 may be exterior-mounted relative to the furnace 103. The burner 109 may at least partially extend through the wall 111. On an inside of the wall 111, a fuel passage 117 and an air passage 119 of the burner 109 may be exposed and in fluid communication with the interior of the furnace 103. For example, the fuel passage 117 and the air passage 119 may respectively be arranged to direct fuel and air into the furnace 103. The air and fuel delivered by the burner 109 may ignite and provide heat (e.g., through a flame) into the furnace 103. This may allow the burner 109 to facilitate melting of any material delivered by the loader 107 into the furnace 103. Upon melting and conversion from a solid to a liquid state, the resulting molten metal may accumulate within the furnace 103, e.g., below and/or up to the fill line 115. The furnace 103 may be equipped with suitable conduits and/or other drainage mechanisms to allow the molten metal to flow out of the furnace 103 and into a subsequent metal processing vessel or area.

The burner 109 may be positioned so that the fuel passage 117 and the air passage 119 are located above the fill line 115 of the furnace 103 and therefore above a level at which molten metal will be expected to pool during processing by the furnace 103. However, in use, splashed molten metal (e.g., which may result from displacement of molten metal due to new material being introduced and dropped by the loader 107 through the top of the furnace 103) may nevertheless, in certain situations, reach portions of the burner 109 such as the air passage 119. Such splashed molten metal may subsequently solidify and create build-up or other blockages that may negatively impact operation of the burner 109. Localized high velocity gasses can occur due to the impulse through the ports of the burner 109 for air or gas and as combustion takes place within the furnace 103. These high velocity gasses can strip droplets of metal from the charge and deposit them elsewhere within the furnace 103. In the case of regenerative burners, where a substantial portion of the gasses exiting the furnace 103 may be drawn through a burner 109 that is in an exhaust mode, these droplets can agglomerate in the burner 109 and subsequently oxidize, forming a significant blockage.

To address such build-up or blockages, the burner 109 may include an access passage 121. The access passage 121 may permit the air passage 119 to be reached from an outside or an exterior of the furnace 103 to address the build-up of any metal splashed and solidified or entrained and agglomerated within the furnace 103 and/or the burner 109. Permitting the air passage 119 to be reached from outside the furnace 103 may allow blockages to be removed by actions initiated by personnel outside the heated zone of the furnace 103 and therefore may allow for a shorter stoppage time than if production of the furnace 103 were instead ceased for a sufficient amount of time to let the interior temperature drop to a level safe for personnel to enter to remove the blockages from inside the furnace 103.

The access passage 121 may be engaged by other structures (not shown in FIG. 1 so as to avoid obscuring the access passage 121 in FIG. 1). Such components that engage the access passages 121 may effectively seal off the access passages 121 and allow the burner 109 to be utilized in normal operation. For example, the access passage 121 may be sealed during operation of the furnace to reduce and/or eliminate leakage of air or other gases (or heat) through the access passage 121 that might otherwise negatively impact the functionality of the burner 109. Some examples of such components are described in greater detail with respect to FIG. 2 and subsequent figures.

Figure 2:
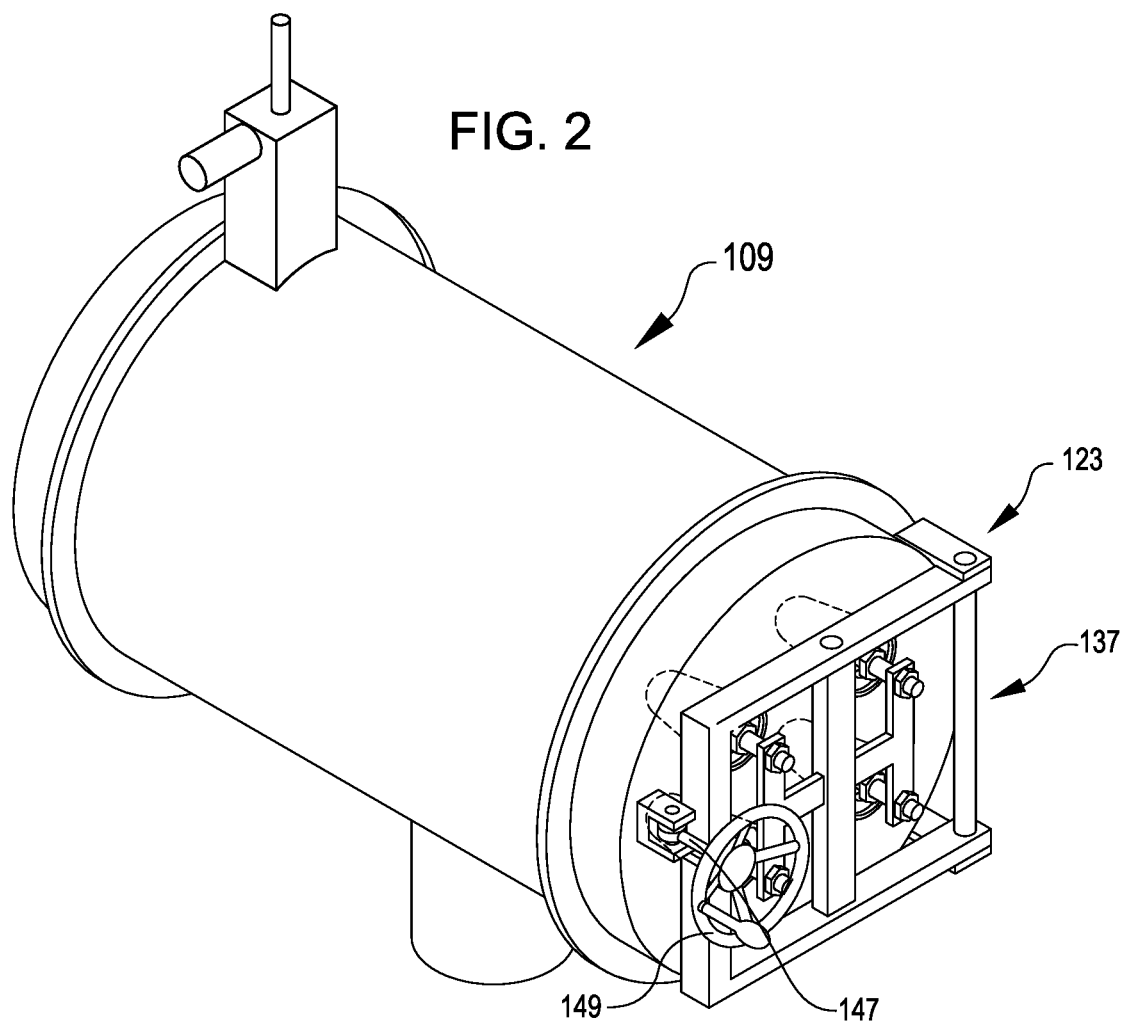
FIG. 2 is a perspective view of a burner from FIG. 1 with tapered plugs in sealed engagement according to various embodiments.
Figure 3:
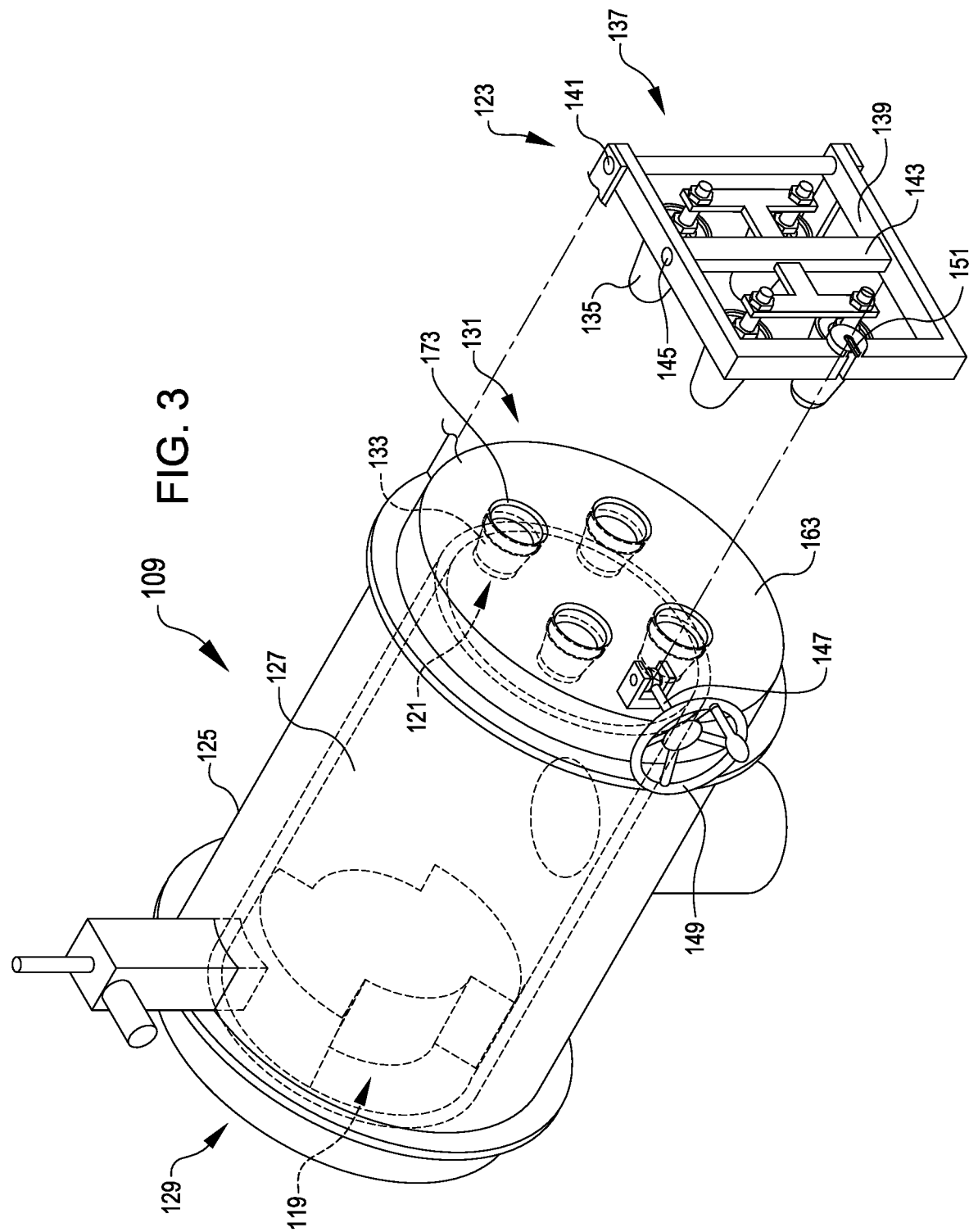
FIG. 3 is a partially exploded perspective view of the burner of FIG. 2 according to various embodiments.
Figure 6:
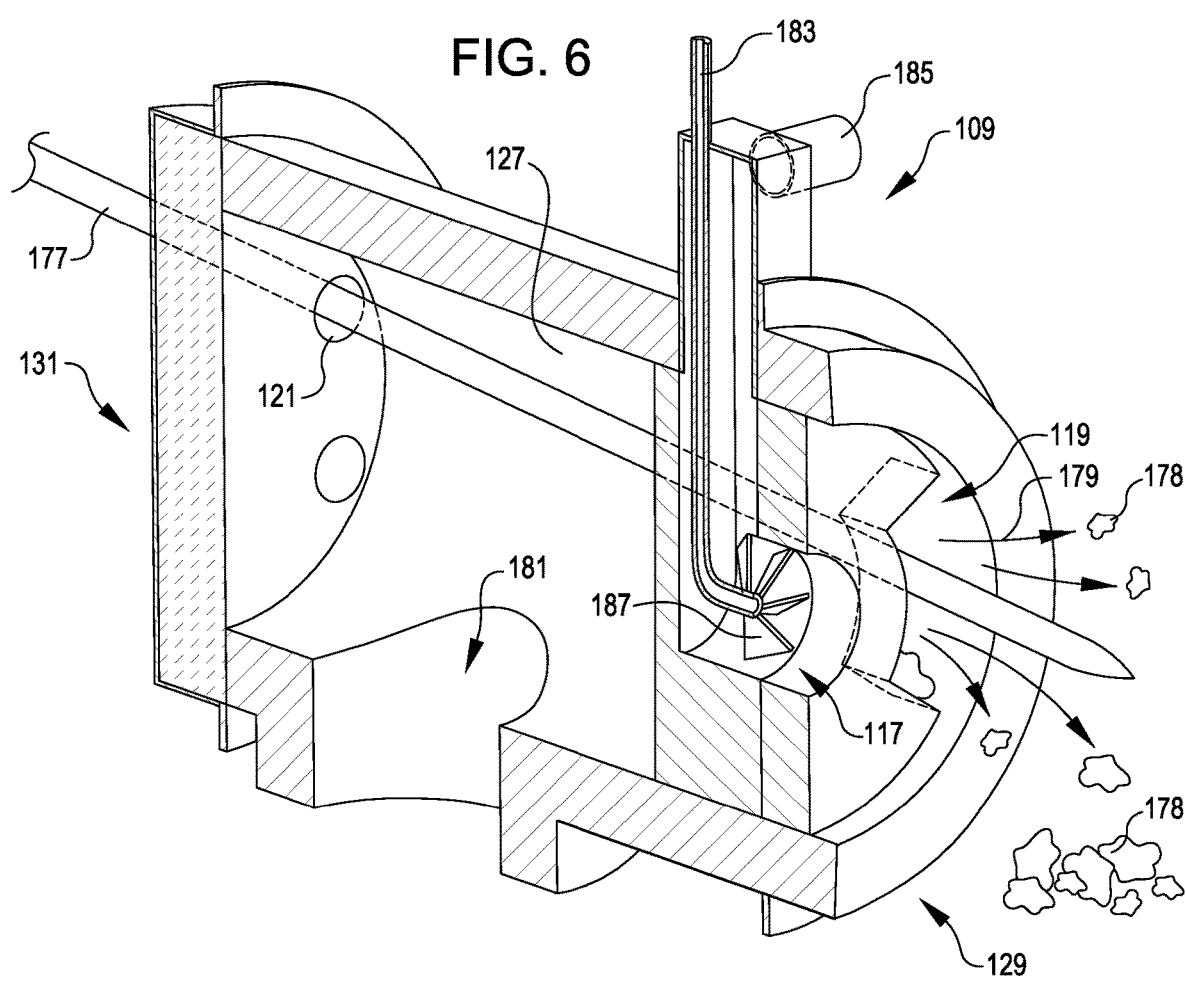
FIG. 6 is a cross-sectional side perspective view of the burner of FIG. 2 illustrating a method of cleaning the burner according to various embodiments.

FIG. 2 depicts a side perspective view of a burner 109 in isolation from the furnace 103. The burner 109 in FIG. 2 is shown engaged by a sealing assembly 123. FIG. 3 depicts the sealing assembly 123 partially exploded from a body 125 of the burner 109. The body 125 can define chamber 127 having a front face 129 and a rear face 131. In operation, the front face 129 and the rear face 131 may be respectively positioned (e.g., with reference to FIG. 1) within the furnace 103 and outside the furnace 103. The air passage 119 (e.g., FIG. 3) can be defined through the front face 129. Similarly, the fuel passage 117 may be defined through the front face 129 (for example, as may be appreciated from FIG. 6 discussed further below). The access passage 121 may extend through the rear face 131 (e.g., FIG. 3).

The access passage 121 may be shaped to include one or more seats 133. Each of the seats 133 may be tapered. The one or more seats 133 may form an entrance to the access passage 121. The one or more seats 133 each may be sized to receive a corresponding plug 135. The plug 135 may be tapered. For example, the plug 135 and/or the seat 133 may be conical or frusto-conical in shape. The plug 135 may be moveable between a sealing configuration in which the plug 135 is received in a respective seat 133 and a cleaning configuration in which the plug 135 is removed from the seat 133. For example, in the cleaning configuration, the plug 135 may be removed from the seat 133 to expose the access passage 121, which, as described further by way of example below, may permit insertion of a rod 177 or other rigid structure through the access passage 121 to dislodge blockage from the air passage 119.

Any suitable number of plugs 135 and corresponding seats 133 may be utilized for a respective burner 109. Suitable numbers may include one, two, three, four, or more than four, although first, second, third, and fourth plugs 135 and corresponding seats 133 are depicted by way of example in FIG. 3. However, for clarity purposes, the discussion below will primarily focus on an individual plug 135 and seat 133 relative to the burner 109. The plugs 135 and corresponding seats 133 may have any suitable size.

The sealing assembly 123 can include the plug 135 and a suitable structure for retaining the plug 135 in the seat 133, e.g., in sealing engagement with the access passage 121. One example of such a structure is shown in FIG. 3, although other clamping bars, hinged linkages, or other structure capable of providing a compressive force on the plug 135 may be utilized.

In FIG. 3, the depicted sealing assembly 123 includes a clamp bar assembly 137. The clamp bar assembly 137 can include a first arm pivotable relative to the body 125 of the burner 109. For example, the first arm 139 may be mounted about a first pivot 141. The clamp bar assembly 137 may thus correspond to a hinged linkage. The plug 135 can be ultimately supported by the first arm 139 (e.g., directly or through any intervening structure), for example, such that pivoting of the first arm 139 will cause a corresponding movement of the plug 135 relative to the body 125 of the burner.

The first arm 139 may be coupled with a second arm 143 that is rotatable relative to the first arm 139 (e.g., via a second pivot 145). The first arm 139 depicted in FIG. 3 is rectangular in shape and captures the second arm 143 between opposite sides or prongs of the first arm 139, although other shapes and/or arrangements relative to the first arm 139 and/or the second arm 143 may be utilized.

The plug 135 can be mounted on the second arm 143 either directly or through spars or other intervening structure. In general, pivoting action of the first arm 139 may bring the plug 135 into general proximity of the seat 133, and pivoting action of the second arm 143 (when present) relative to the first arm 139 may allow a more precise alignment of the plug 135 relative to the seat 133 to be accomplished as the plug 135 approaches and/or enters the seat 133.

The sealing assembly 123 may additionally include or interact with a securing structure. For example, in FIG. 3, the depicted sealing assembly 123 also includes a locking member 147 and a locking wheel 149, although other securing structures may additionally or alternatively be utilized to secure the clamp bar assembly 137 or other form of the sealing assembly 123. With respect to the depicted arrangement, the locking member 147 may be sized to be received within a notch 151 within the clamp bar assembly 137 and retain the clamp bar assembly 137 in a state engaged with the burner 109 such that the plug 135 is received in the seat 133 in a sealed configuration (e.g., as shown in FIG. 2). The locking wheel 149 may be rotatable to apply a compressive force along the locking member 147 for releasably securing the clamp bar assembly 137 with the plug 135 in the sealed configuration relative to the burner 109.

Figure 4:
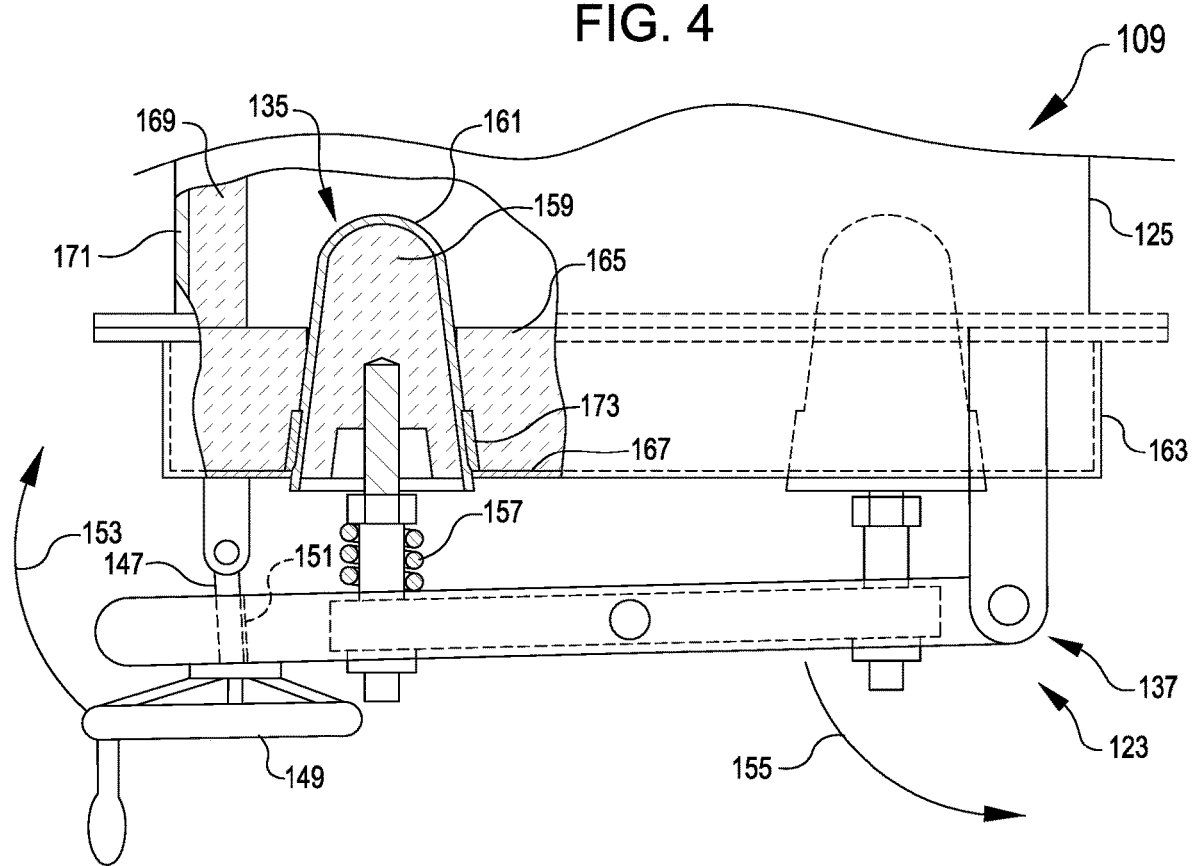
FIG. 4 is a cross-sectional top view of a portion of the burner of FIG. 2 with tapered plugs in sealed engagement according to various embodiments.

In operation, e.g., with reference to FIG. 4, to obtain access into the burner 109 from the outside, the locking wheel 149 may be loosened or turned to reduce an amount of compression applied on the clamp bar assembly 137. For example, the locking wheel 149 may be moved to a position that may allow the locking member 147 to pivot out of the notch 151 (e.g., as illustrated by arrow 153 in FIG. 4). This may allow the clamp bar assembly 137 to be pivoted (e.g., as depicted by arrow 155 in FIG. 4). Pivoting the clamp bar assembly 137 may remove the plugs 135 from their respective seats 133, for example, allowing the clamp bar assembly 137 and/or sealing assembly 123 to arrive at the state depicted in FIG. 5. In some embodiments, the hinged or articulated nature of the sealing assembly 123 or the clamp bar assembly 137 may allow multiple plugs 135 to be aligned relative to multiple seats with a single movement or pivoting of the sealing assembly 123. Moreover, although in FIG. 3 the sealing assembly 123 is depicted by way of example as operating relative to four plugs 135, other variations are also possible, including, but not limited to, arrangements in which a sealing assembly 123 operates relative to one, two, three, or some other different number of plugs 135 and/or in which multiple sealing assemblies 123 (which may be the same or different from one another) are each implemented relative to one or more plugs 135.

Referring again to FIG. 4, the sealing assembly 123 can include a biasing mechanism 157 that may bias the plug 135 into the seat 133, e.g., into the sealing configuration. In FIG. 4, the biasing mechanism 157 is depicted as a coil spring, although any other suitable form of spring or other biasing mechanism may be used. Including a biasing mechanism 157 for each respective plug 135 may permit the plug 135 to engage its respective seat 133 even if small deviations in alignment and/or loading are encountered from the sealing assembly 123.

In FIG. 4, a cross-section is shown of various parts representing different materials that may be utilized. For example, the plug 135 may include a mandrel 159 and a liner 161. The mandrel 159 may be constructed of refractory material, such as a dense refractory material capable of withstanding full temperatures expected of the furnace 103 and/or burner 109. The liner 161 may be constructed of inorganic fiber. Examples of inorganic fiber may include fiberglass or a form of refractory ceramic fiber (e.g., mineral wool). In some aspects, including the liner 161 may provide a more durable surface for the plug 135 than if the material forming the mandrel 159 were directly exposed to repeated contact with portions of the seat 133 from being removed and inserted to block the access passage 121. Additionally or alternatively, the liner 161 may function as a gasket and provide a suitably flexible layer to occupy space between the seat 133 and the mandrel 159 for reliably sealing the access passage 121 in a releasable and repeatable manner. Including the liner 161 may additionally or alternatively increase an ease with which the plug 135 can be inserted and/or removed relative to the seat 133 (e.g., without sticking). Furthermore, the liner 161 in many embodiments may be readily removed from the mandrel 159 for replacement.

Multi-layer constructions can also be applied elsewhere for the burner 109. For example, as may be best illustrated at left in FIG. 4, the body 125 of the burner 109 can be formed of an outer casing 171 and an inner lining 169. The inner lining 169 may be constructed of refractory material, such as an insulating castable refractory and/or a low-density refractory material. The outer casing 171 may be steel or another metal. In such a construction, the inner lining 169 of refractory material may permit the body 125 of the burner 109 to withstand temperatures within the burner 109 and adequately insulate to prevent excessive heat from reaching an outer periphery of the lining 169. The outer casing of steel or other metal can support the inner lining 169 of the refractory material and keep the burner 109 airtight as appropriate.

The body 125 of the burner 109 may also include or be coupled with a rear plate 163. For example, with reference to FIG. 3, the rear plate 163 may at least partially define the rear face 131 of the chamber 127 of the burner 109. With reference again to FIG. 4, the rear plate 163 may include an inner layer 165 (e.g., including refractory material) and an outer layer 167 (e.g., including metal material, which may be disposed outwardly from the refractory material of the inner layer 165). In some embodiments, the inner layer 165 may include multiple components, such as an insulative castable refractory material, fiber insulation, and refractory fiber paper (e.g., which may be positioned against the outer layer 167 of metal material in a manner that may mitigate stresses that might otherwise be generated on the refractory material when dried and heated). A construction or arrangement of materials with refractory material in the inner layer 165 and metal material in the outer layer 167 of the rear plate 163 may provide suitable heat resistance within the burner 109 by the refractory material of the inner layer 165 and also provide suitable retention or dimensional stability by the metal of the outer layer 167 notwithstanding variable levels of expansion of the refractory material that may occur at different temperatures.

The access passage 121 may be defined through the rear plate 163. For example, the access passage 121 may extend both through the outer layer 167 of metal material and through the inner layer 165 of refractory material.

Figure 5:
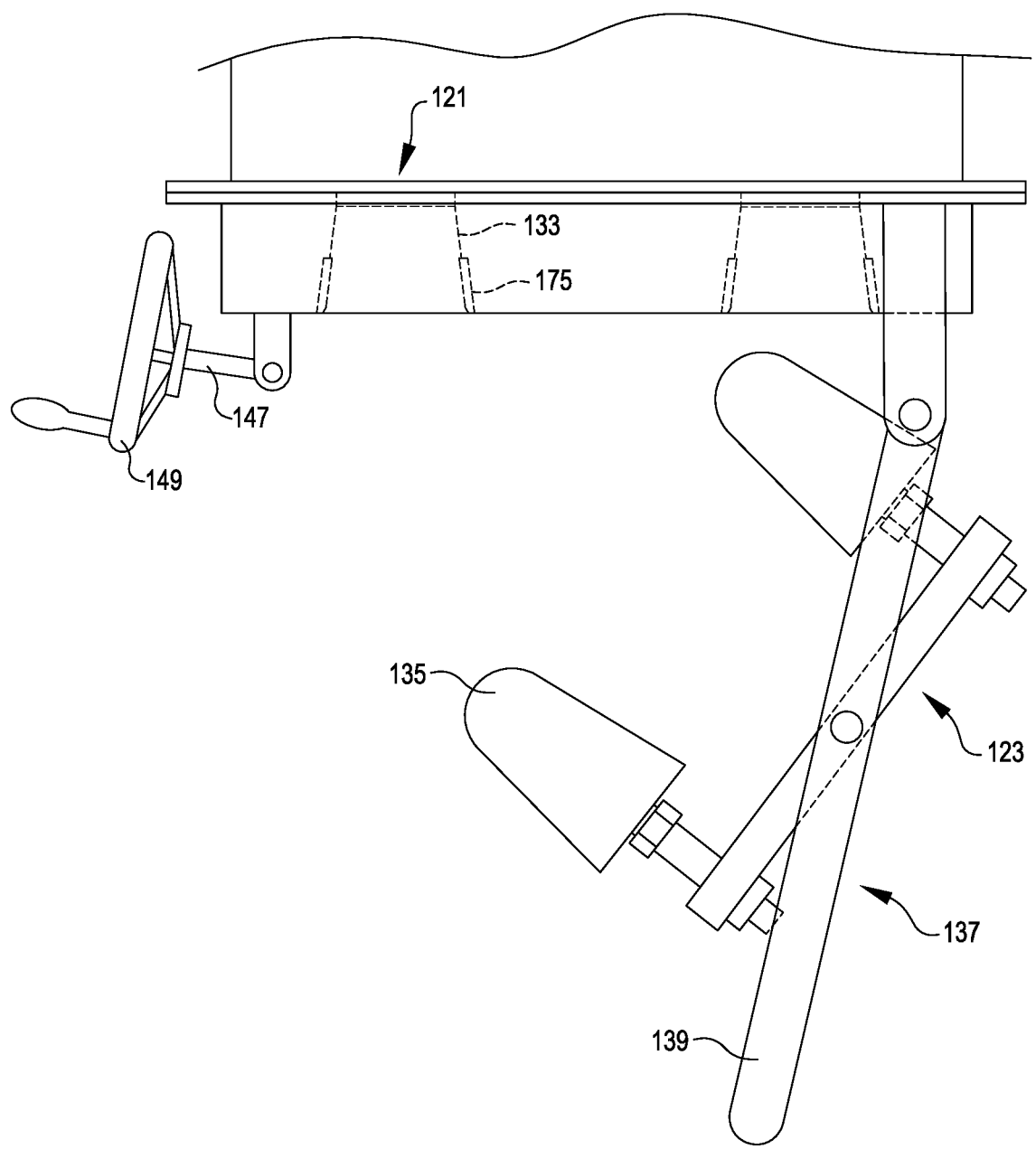
FIG. 5 is a cross-sectional top view similar to FIG. 4 but with tapered plugs removed from sealed engagement according to various embodiments.

In some embodiments, a frusto-conical insert 173 may be received within and/or form part of the seat 133. For example, the frusto-conical insert 173 (such as depicted in FIGS. 3 and 4) may be constructed of metal and received in an inset area 175 (such as depicted in FIG. 5) in the rear plate 163 and may extend inward from or through the metal material of the outer layer 167 of the rear plate 163 and into the refractory material of the inner layer 165. In some embodiments, the frusto-conical insert 173 may be welded to the metal material of the outer layer 167 of the rear plate 163, for example. The frusto-conical insert 173 may be shaped for receiving the plug 135. Such a frusto-conical insert 173 of a different material (e.g., metal) may provide a strong wear surface for withstanding repeated insertion and removal of the plugs 135 and overall may be more capable of retaining a suitable shape to facilitate sealing and less prone to chipping or deterioration than the refractory material in the inner layer 165.

Figure 7:
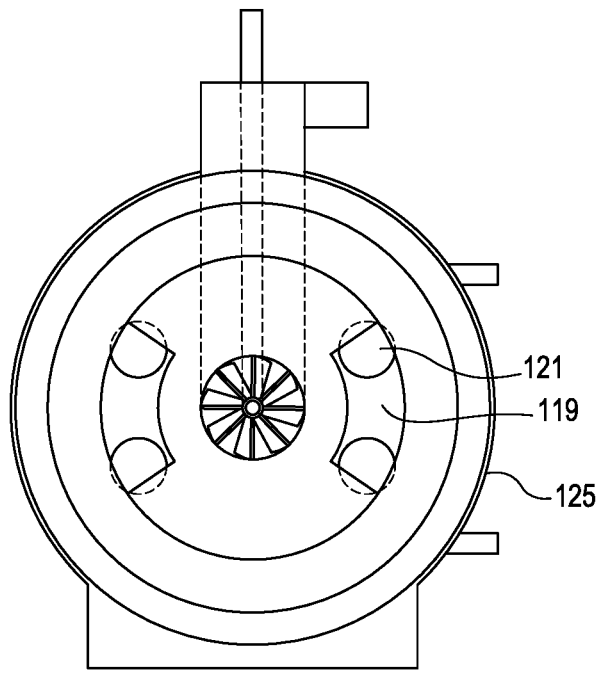
FIG. 7 is an end view of the burner of FIG. 6 according to various embodiments.

With reference to FIG. 7, the access passage 121 may be aligned with the air passage 119, for example, along a longitudinal axis of the body 125 of the burner 109. Alignment between the access passage 121 and the air passage 119 may facilitate reaching the air passage 119 via a path through the access passage 121. For example, with reference to FIG. 6, the access passage 121, when exposed (e.g., in response to removal of the tapered plugs 135) may allow a rod 177 or other rigid, semi-rigid, or non-rigid structure to be inserted through the access passage 121 and extended through the chamber 127 to reach the air passage 119 and dislodge any blockage 178 (e.g., as illustrated by arrows 179).

Dislodging or otherwise removing the blockage 178 may facilitate air flow through the air passage 119, e.g., either into or out of the burner 109 or both. Air flow through the air passage 119 may enable proper operation of the burner 109. For example, in a firing mode, the burner 109 may introduce natural gas or other fuel through a fuel line 183 while air is supplied in through a duct 181 and out through the air passage 119 of the burner 109. Fuel from the fuel line 183 can mix with the air from the air passage 119 in a combustion reaction to provide heat to the furnace 103. Removing the blockage 178 may thus allow a suitable amount of air flow to attain a desired ratio of fuel and air, such as to keep a ratio near stoichiometric and/or otherwise reduce amounts of unburned fuel and/or exhaust products.

In some embodiments, an air inlet 185 (e.g., distinct from the duct 181) may supply air about the fuel line 183. The air through the air inlet 185 may be forced over vanes 187 that may spin the air to force mixing and stabilize a resulting flame from the burner 109. In some embodiments, the air inlet 185 may provide cooling air to prevent thermal oxidation of the fuel line 183 and/or the vanes (if present). In some embodiments, air supplied through the air inlet 185 may be preheated, e.g., by an amount limited to keep the metallic parts that are exposed to flame radiation below their oxidation stability temperature limit.

Additionally or alternatively, air may be pre-heated when introduced through the duct 181 for delivery out through the air passage 119. In some embodiments, exhaust may be routed through a flue port (e.g., with respect to FIG. 1, through the wall 111 or the cover 105 of the furnace 103) and to a suitable recuperator, regenerator (such as a heat wheel), or other heat exchanger capable of transferring heat from the exhaust to fresh air that may be introduced through the duct 181. In some embodiments, the burner 109 may be configured to cycle between an exhaust mode (e.g., in which heated exhaust air from the furnace 103 is sucked in through the air passage 119 and routed out through the duct 181 toward a suitable regenerator, recuperator, or other heat exchanger capable of absorbing heat from the exhaust) and a firing mode (e.g., in which fresh air absorbs heat by passage by or through the regenerator etc. and then flows in through the duct 181 and out through the air passage 119 to combine with the fuel introduced through the fuel line 183). In some embodiments, exhaust pulled in through the air passage 119 may additionally or alternatively be routed out through an appropriate structure (such as the duct 181 and/or the flue port described above) and to a recuperator, regenerator, or other heat exchanger for preheating air through the air inlet 185.

More generally, dislodging or otherwise removing the blockage 178 may be particularly relevant for the air passage 119 because the air passage 119 may be particularly susceptible to build-up of blockage 178 due to the possibility that air pulled in or pushed out through the air passage 119 may provide a suction effect that draws or entrains droplets or splashed molten metal or oxide into the air passage 119 prior to solidification or agglomeration that results in the blockage 178. However, techniques herein are not limited to removal of blockage 178 from the air passage 119, and suitable adaptations may be made for implementing to facilitate removal of blockage 178 from the fuel passage 117 or other relevant portion of the system 101.

Figure 8:
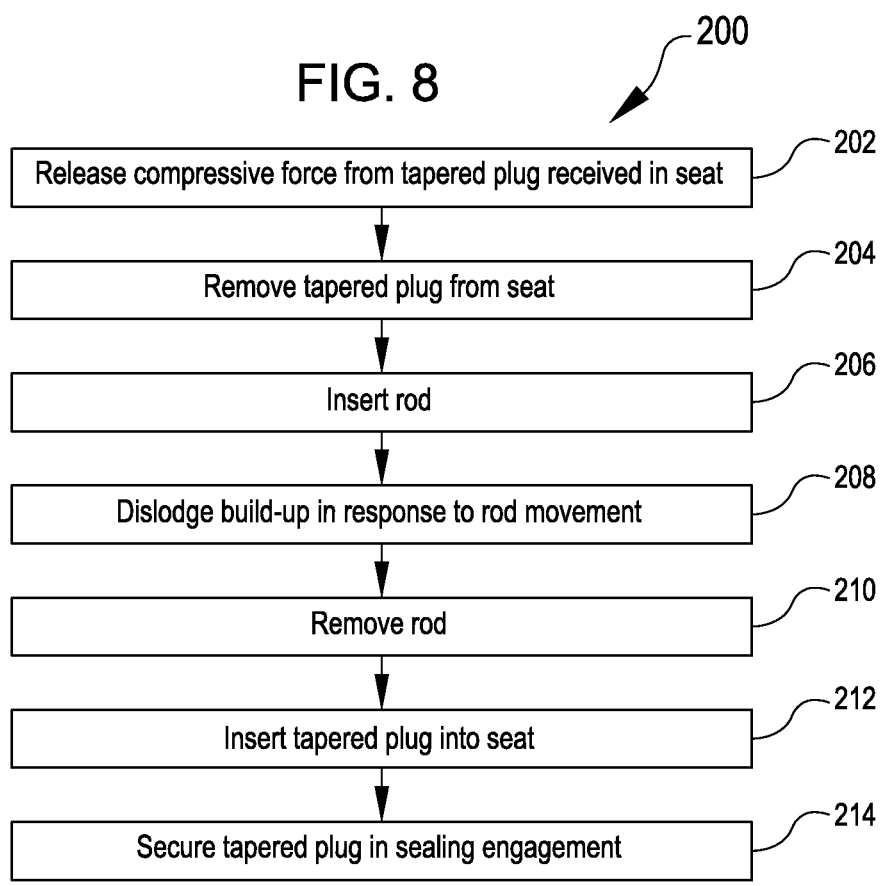
FIG. 8 is a flow chart illustrating a method of servicing a burner assembly according to various embodiments.

FIG. 8 is a flow chart illustrating a method 200 of servicing a burner, such as the burner 109. The method 200 at 202 may include releasing a compressive force from the plug 135 received in the seat 133. For example, this may correspond to using the locking wheel 149 to release a force applied on the clamp bar assembly 137. This may additionally or alternatively involve releasing the biasing mechanism 157 and/or otherwise releasing a sealing assembly 123.

The method 200 at 204 may involve removing the plug 135 from the seat 133, e.g., which may be positioned in an exterior portion of the burner 109. Removing the plug 135 from the seat 133 may expose the access passage 121 from a position outside the wall 111 of the metal-melting furnace 103 into which the burner 109 is directed. In some embodiments, removing the plug 135 involves pivoting the first arm 139 or other portion of a hinged linkage supporting the plug 135 and pivoting the hinged linkage away from the exterior portion of the burner 109.

The method 200 at 206 may include inserting a rod, such as the rod 177 discussed above with respect to FIG. 6 or other structure. At least a portion of the rod 177 (such as a tip of the rod 177) may be inserted through the length of the body 125 of the burner 109. For example, inserting the rod 177 may involve pushing the rod 177 from outside the burner 109 and outside the metal-melting furnace 103. Inserting the rod 177 may additionally involve pushing the rod 177 in through the access passage 121 exposed by removing the plug 135. Inserting the rod 177 may additionally involve pushing the rod 177 toward or through the air passage 119, which may be positioned extending between an interior of the body 125 of the burner 109 and an inside of the metal-melting furnace 103.

The method 200 at 208 may include dislodging build-up or blockage 178. The blockage 178 may correspond to metal. For example, the build-up 178 may be from metal splashed from the furnace 103 and solidified in the air passage 119. In some cases, the blockage may include oxides. For example, metal may be oxidized in situ in the burner 109 or other portion of the system 101. Additionally or alternatively, oxide from melting scrap may be carried into the burner 109 with metal being splashed or via entrainment in the flow of exhaust gasses, such as through the air passage 119. Generally, the build-up 178 may be dislodged from the air passage 119 and in response to movement of the rod 177 toward or through the air passage 119. More generally, the rod 177 may be effective to dislodge an obstruction 178 from the air passage 119.

The method 200 at 210 may include removing the rod 177. For example, the rod 177 may be pulled back through the air passage 119, back through the body 125 of the burner 109, and out through the access passage 121.

The method 200 at 212 may include sealing the burner 109 for operation. For example, this may correspond to sealing the access passage 121 by inserting the plug 135 into the seat 133 in the exterior portion of the burner 109, e.g., as discussed above. In some embodiments, sealing the access passage 121 includes biasing the plug 135 into the seat 133 in the exterior portion of the burner 109. For example, this may correspond to the biasing mechanism 157 acting on the plug 135 to apply a compressive force to retain the plug 135 in the seat 133. In some embodiments, sealing the access passage 121 includes pivoting a hinged linkage supporting the plug 135 and pivoting the hinged linkage toward the exterior portion of the burner 109. For example, this may correspond to actuating the clamp bar assembly 137 toward a sealed configuration (e.g., FIG. 4).

The method 200 at 214 may include securing the plug 135 in sealing engagement. In some embodiments, this may include releasably securing the hinged linkage or other sealing assembly 123 relative to the exterior portion of the burner. For example, this may correspond to engaging the locking member 147 in the notch 151 within the clamp bar assembly 137 and operating the locking wheel 149 to apply a compressive force for achieving the sealing engagement. In some embodiments, securing the plug 135 in sealing engagement may additionally or alternatively include biasing the plug 135 into the seat 133 through action of the biasing mechanism 157 or other structure for exerting a compressive force on the plug 135 to retain the sealing engagement.

Some actions described above may correspond to methods performed individually and independently of other operations described.

In some aspects, a device, a system, or a method is provided according to one or more of the following examples or according to some combination of the elements thereof. In some aspects, features of a device or a system described in one or more of these examples can be utilized within a method described in one of the other examples, or vice versa.

Example 1 is a method (which may include features of any of the subsequent examples) comprising: removing a tapered plug from a seat in an exterior portion of a burner to expose an access passage from a position outside a wall of a metal-melting furnace; pushing a rod from outside the burner and outside the metal-melting furnace, in through the access passage exposed by removing the tapered plug, and toward or through an air passage extending between an interior of a body of the burner and an inside of the metal-melting furnace; and dislodging, from the air passage and in response to movement of the rod toward or through the air passage, build-up of metal splashed from the metal-melting furnace and solidified in the air passage.

Example 2 is the method of example 1, or any of the preceding or subsequent examples, wherein removing the tapered plug comprises pivoting a hinged linkage supporting the tapered plug and pivoting the hinged linkage away from the exterior portion of the burner.

Example 3 is the method of example 1, or any of the preceding or subsequent examples, further comprising: removing the rod from the access passage; and sealing the access passage by inserting the tapered plug into the seat in the exterior portion of the burner.

Example 4 is the method of example 3, or any of the preceding or subsequent examples, wherein sealing the access passage further comprises biasing the tapered plug into the seat in the exterior portion of the burner.

Example 5 is the method of example 3, or any of the preceding or subsequent examples, wherein sealing the access passage further comprises pivoting a hinged linkage supporting the tapered plug and pivoting the hinged linkage toward the exterior portion of the burner.

Example 6 is the method of example 5, or any of the preceding or subsequent examples, further comprising releasably securing the hinged linkage relative to the exterior portion of the burner.

Example 7 is a system (which may include features of any of the preceding or subsequent examples) comprising: a top charge furnace comprising a wall bounding an inside of the top charge furnace; a burner extending through the wall and comprising a body defining: a front face within the inside of the top charge furnace; a rear face outside of the inside of the top charge furnace; an air passage through the front face; a fuel passage through the front face; and an access passage through the rear face and aligned with the air passage to permit a structure to be passed through the burner from outside the top charge furnace to clean out build-up of solidified metal from the air passage; and a tapered plug releasably received in the rear face and in sealing engagement with the access passage to seal off the access passage during operation of the burner.

Example 8 is the system of example 7, or any of the preceding or subsequent examples, wherein the top charge furnace comprises a fill line corresponding to a capacity limit for molten metal within the top charge furnace, and wherein the front face of the burner is positioned above the fill line.

Example 9 is the system of example 7, or any of the preceding or subsequent examples, wherein the tapered plug is conical in shape.

Example 10 is the system of example 7, or any of the preceding or subsequent examples, wherein the tapered plug comprises: a mandrel formed of refractory material; and a liner disposed over the mandrel and formed of an inorganic fiber.

Example 11 is the system of example 7, or any of the preceding or subsequent examples, wherein the body further comprises: a rear plate defining the rear face and comprising a layer of refractory material and a layer of metal material disposed outwardly from the refractory material, wherein the access passage is defined through the layer of metal material and the layer of refractory material.

Example 12 is the system of example 11, or any of the preceding or subsequent examples, further comprising a frusto-conical metal insert extending inward from the layer of metal material and into the layer of refractory material.

Example 13 is a burner assembly (which may include features of any of the preceding or subsequent examples) comprising: a body defining a chamber having a front face and a rear face; an air passage defined through the front face; a fuel passage defined through the front face; an access passage defined through the rear face and aligned with the air passage; a tapered seat forming an entrance to the access passage; and a tapered plug moveable between a sealing configuration and a cleaning configuration, the tapered plug in the sealing configuration being received in the tapered seat to seal the access passage during operation of the burner assembly, and the tapered plug in the cleaning configuration being removed from the tapered seat to expose the access passage and permit insertion of a rigid structure through the access passage to dislodge any blockage from the air passage.

Example 14 is the burner assembly of example 13, or any of the preceding or subsequent examples, further comprising a biasing mechanism for biasing the tapered plug into the sealing configuration.

Example 15 is the burner assembly of example 13, or any of the preceding or subsequent examples, further comprising a hinged linkage supporting the tapered plug.

Example 16 is the burner assembly of example 16, or any of the preceding or subsequent examples, wherein the hinged linkage comprises: a first arm pivotable relative to the body; and a second arm rotatable relative to the first arm, wherein the tapered plug is mounted on the second arm.

Example 17 is the burner assembly of example 16, or any of the preceding or subsequent examples, further comprising a locking member pivotable to the body and sized to be received by the hinged linkage for securing the hinged linkage in a position retaining the tapered plug in the sealing configuration.

Example 18 is the burner assembly of example 17, or any of the preceding or subsequent examples, wherein the locking member is coupled with a locking wheel rotatable to apply a compressive force along the locking member for securing the hinged linkage.

Example 19 is the burner assembly of example 16, or any of the preceding or subsequent examples, wherein the tapered plug is a first tapered plug, and wherein the second arm supports a second tapered plug for releasable sealing engagement with a second access passage.

Example 20 is the burner assembly of example 19, or any of the preceding or subsequent examples, wherein the hinged linkage is securable to the body to secure both the first tapered plug and the second tapered plug relative to the body.

All patents, publications and abstracts cited above are incorporated herein by reference in their entirety. The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A method comprising:
   removing a tapered plug from a seat in an exterior portion of a burner to expose an access passage from a position outside a wall of a metal-melting furnace;
   pushing a rod from outside the burner and outside the metal-melting furnace, in through the access passage exposed by removing the tapered plug, and toward or through an air passage extending between an interior of a body of the burner and an inside of the metal-melting furnace, wherein the air passage and the access passage are separate from a fuel passage of the burner; and
   dislodging, from the air passage and in response to movement of the rod toward or through the air passage, build-up of metal and/or oxide splashed from the metal-melting furnace and solidified in the air passage.

2. The method of claim 1, wherein removing the tapered plug comprises pivoting a hinged linkage supporting the tapered plug and pivoting the hinged linkage away from the exterior portion of the burner.

3. The method of claim 1, further comprising:
   removing the rod from the access passage; and
   sealing the access passage by inserting the tapered plug into the seat in the exterior portion of the burner.

4. The method of claim 3, wherein sealing the access passage further comprises biasing the tapered plug into the seat in the exterior portion of the burner.

5. The method of claim 3, wherein sealing the access passage further comprises pivoting a hinged linkage supporting the tapered plug and pivoting the hinged linkage toward the exterior portion of the burner.

6. The method of claim 5, further comprising releasably securing the hinged linkage relative to the exterior portion of the burner.

7. A system comprising:
   a top charge furnace comprising a wall bounding an inside of the top charge furnace;
   a burner extending through the wall and comprising a body defining:
   a front face within the inside of the top charge furnace;
   a rear face outside of the inside of the top charge furnace;
   an air passage through the front face;
   a fuel passage separate from the air passage and defined through the front face; and
   an access passage separate from the fuel passage, defined through the rear face, and aligned with the air passage to permit a structure to be passed through the burner from outside the top charge furnace and through the front face to clean out build-up of solidified metal and/or oxide from the air passage; and
   a tapered plug releasably received in the rear face and in sealing engagement with the access passage to seal off the access passage during operation of the burner.

8. The system of claim 7, wherein the top charge furnace comprises a fill line corresponding to a capacity limit for molten metal within the top charge furnace, and wherein the front face of the burner is positioned above the fill line.

9. The system of claim 7, wherein the tapered plug is conical in shape.

10. The system of claim 7, wherein the tapered plug comprises: a mandrel formed of refractory material; and
    a liner disposed over the mandrel and formed of an inorganic fiber.

11. The system of claim 7, wherein the body further comprises:
    a rear plate defining the rear face and comprising a layer of refractory material and a layer of metal material disposed outwardly from the refractory material, wherein the access passage is defined through the layer of metal material and the layer of refractory material.

12. The system of claim 11, further comprising a frustoconical metal insert extending inward from the layer of metal material and into the layer of refractory material.

13. A burner assembly comprising:
    a body defining a chamber having a front face and a rear face;
    an air passage defined through the front face;
    a fuel passage separate from the air passage and defined through the front face;
    an access passage separate from the fuel passage, defined through the rear face, and aligned with the air passage;
    a tapered seat forming an entrance to the access passage; and
    a tapered plug moveable between a sealing configuration and a cleaning configuration, the tapered plug in the sealing configuration being received in the tapered seat to seal the access passage during operation of the burner assembly, and the tapered plug in the cleaning configuration being removed from the tapered seat to expose the access passage and permit insertion of a rigid structure through the access passage and the front face to dislodge any blockage from the air passage.

14. The burner assembly of claim 13, further comprising a biasing mechanism for biasing the tapered plug into the sealing configuration.

15. The burner assembly of claim 13, further comprising a hinged linkage supporting the tapered plug.

16. The burner assembly of claim 15, wherein the hinged linkage comprises:
    a first arm pivotable relative to the body; and
    a second arm rotatable relative to the first arm, wherein the tapered plug is mounted on the second arm.

17. The burner assembly of claim 16, further comprising a locking member pivotable to the body and sized to be received by the hinged linkage for securing the hinged linkage in a position retaining the tapered plug in the sealing configuration.

18. The burner assembly of claim 17, wherein the locking member is coupled with a locking wheel rotatable to apply a compressive force along the locking member for securing the hinged linkage.

19. The burner assembly of claim 16, wherein the tapered plug is a first tapered plug, and wherein the second arm supports a second tapered plug for releasable sealing engagement with a second access passage.

20. The burner assembly of claim 19, wherein the hinged linkage is securable to the body to secure both the first tapered plug and the second tapered plug relative to the body.

* * * * *